US011514864B2

(12) United States Patent
Kim et al.

(10) Patent No.: US 11,514,864 B2
(45) Date of Patent: Nov. 29, 2022

(54) DISPLAY DEVICE AND DRIVING METHOD THEREOF

(71) Applicant: SAMSUNG DISPLAY CO., LTD., Yongin-si (KR)

(72) Inventors: Won Tae Kim, Yongin-si (KR); Myeong Su Kim, Yongin-si (KR); Bo Yeon Kim, Yongin-si (KR); Jae Han Lee, Yongin-si (KR); Whee Won Lee, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 17/185,155

(22) Filed: Feb. 25, 2021

(65) Prior Publication Data

US 2022/0020334 A1 Jan. 20, 2022

(30) Foreign Application Priority Data

Jul. 16, 2020 (KR) ........................ 10-2020-0088420

(51) Int. Cl.
*G09G 3/3225* (2016.01)
*G09G 3/3275* (2016.01)
(Continued)

(52) U.S. Cl.
CPC ......... *G09G 3/3275* (2013.01); *G09G 3/3225* (2013.01); *G09G 2300/0426* (2013.01); *G09G 2300/0819* (2013.01); *G09G 2300/0842* (2013.01); *G09G 2310/0291* (2013.01); *G09G 2310/08* (2013.01); *G09G 2320/029* (2013.01);
(Continued)

(58) Field of Classification Search
CPC ....... G09G 2310/0291; G09G 2310/08; G09G 2320/0233–045; G09G 2330/021
See application file for complete search history.

(56) References Cited

U.S. PATENT DOCUMENTS 6,054,976 A * 4/2000 Kubota ................ G09G 3/2011
348/E5.135
8,576,147 B2 * 11/2013 Koyama .............. G09G 3/3275
345/76
(Continued)

FOREIGN PATENT DOCUMENTS

KR 105321456 A * 2/2016 ........... G09G 3/3283
KR 20180085204 * 8/2018 ............ G09G 3/006
(Continued)

*Primary Examiner* — Lin Li
(74) *Attorney, Agent, or Firm* — Cantor Colburn LLP

(57) ABSTRACT

A display device includes a display panel including a plurality of pixels connected to data lines and sensing lines, a data driver including a plurality of buffer amplifiers which supplies a first sensing voltage to the data lines during a first sensing period and a sensor which receives a first sensing signal from the pixels through the sensing lines during the first sensing period, and a global amplifier which supplies a second sensing voltage to the data lines during a second sensing period different from the first sensing period. The sensor receives a second sensing signal corresponding to the second sensing voltage from the pixels through the sensing lines during the second sensing period, and generates compensation data based on a difference value between the first sensing signal and the second sensing signal.

17 Claims, 9 Drawing Sheets

(51) Int. Cl.
*H04N 5/374* (2011.01)
*G09G 3/3233* (2016.01)
*G09G 3/3258* (2016.01)
*G09G 3/36* (2006.01)
*G09G 5/00* (2006.01)

(52) U.S. Cl.
CPC ............... *G09G 2320/0233* (2013.01); *G09G 2320/045* (2013.01); *G09G 2330/021* (2013.01)

(56) References Cited

U.S. PATENT DOCUMENTS

| | | | | |
|---|---|---|---|---|
| 2008/0001876 | A1* | 1/2008 | Ito | G09G 3/3655 345/87 |
| 2015/0356898 | A1* | 12/2015 | Jeon | G09G 5/008 345/690 |
| 2016/0189625 | A1* | 6/2016 | Kim | G09G 3/3233 345/205 |
| 2018/0005579 | A1* | 1/2018 | Brahma | G09G 3/3258 |
| 2018/0190192 | A1* | 7/2018 | Kwon | G09G 3/3233 |
| 2020/0098298 | A1* | 3/2020 | Bae | H01Q 1/243 |
| 2020/0106976 | A1* | 4/2020 | Lee | H04N 5/374 |

FOREIGN PATENT DOCUMENTS

| | | | | |
|---|---|---|---|---|
| KR | 20180108148 | A * | 10/2018 | H01Q 1/243 |
| KR | 102059806 | B1 | 2/2020 | |

* cited by examiner

DISPLAY DEVICE AND DRIVING METHOD THEREOF

This application claims priority to Korean Patent Application No. 10-2020-0088420, filed on, Jul. 16, 2020, and all the benefits accruing therefrom under 35 U.S.C. § 119, the content of which in its entirety is herein incorporated by reference.

BACKGROUND

1. Field

The present invention relates to a display device and a driving method thereof.

2. Description of the Related Art

With the development of information technology, the importance of a display device, which is a connection medium between users and information, has been emphasized. In response to this, the use of the display device such as a liquid crystal display device, an organic light emitting display device, and the like has been increasing.

The display device includes pixels, and each of the pixels includes a light emitting element and a driving transistor supplying a driving current to the light emitting element. Each of the pixels may be deteriorated. For example, the threshold voltage and mobility of the driving transistor may be changed over time, and the light emitting element may be deteriorated. In order to compensate for the deterioration of the pixels, a technique of sensing characteristic information of the pixels (that is, the driving transistor and the light emitting element) through an external compensation circuit is used.

SUMMARY

An external compensation circuit may measure a threshold voltage of a driving transistor by applying a sensing voltage to pixels through a buffer amplifier and receiving a sensing signal from the pixels. However, since buffer amplifiers connected to each of a plurality of data lines may have a difference in specifications such as gain due to process deviation in a manufacturing process, deviation between channels may occur during sensing.

When the deviation between channels occurs, compensation for a display device is not accurately performed, and thus defects such as a vertical line may occur on a screen.

An aspect of the present invention is to provide a display device capable of reducing deviation between channels of an external compensation circuit.

Another aspect of the present invention is to provide a driving method of a display device capable of reducing deviation between channels of an external compensation circuit.

However, aspects of the present invention are not limited to the above-described technical problems, and may be variously extended without departing from the spirit and scope of the present invention.

In order to solve the above technical problem, a display device according to an embodiment of the present invention includes: a display panel including a plurality of pixels connected to data lines and sensing lines; a data driver including a plurality of buffer amplifiers and a sensor, where the plurality of buffer amplifiers supplies a first sensing voltage to the data lines during a first sensing period and the sensor receives a first sensing signal from the pixels through the sensing lines during the first sensing period; and a global amplifier which supplies a second sensing voltage to the data lines during a second sensing period different from the first sensing period. The sensor may receive a second sensing signal corresponding to the second sensing voltage from the pixels through the sensing lines during the second sensing period, and generate compensation data based on a difference value between the first sensing signal and the second sensing signal.

The second sensing voltage may have the same value as the first sensing voltage.

The second sensing signal may have a greater value than the first sensing signal.

The first sensing signal may be a value obtained by subtracting the sum of a threshold voltage of a driving transistor included in each of the pixels and a voltage deviation of the buffer amplifiers from the first sensing voltage, and the second sensing signal may be a value obtained by subtracting the threshold voltage of the driving transistor from the second sensing voltage.

The each of the pixels may include a first sub-pixel connected to a first data line among the data lines, a second sub-pixel connected to a second data line among the data lines, and a third sub-pixel connected to a third data line among the data lines.

The first sub-pixel, the second sub-pixel, and the third sub-pixel of the each of the pixels may be connected to one of the sensing lines.

An output terminal of the global amplifier may be connected to the first data line through a first switch, connected to the second data line through a second switch, and connected to the third data line through a third switch.

Each of the first switch, the second switch, and the third switch may be in an open state during the first sensing period.

When the first switch is in a closed state during the second sensing period, the second switch and the third switch may be in the open state, a first buffer amplifier connected to the first data line may be in a high impedance (Hi-z) state, and a second buffer amplifier connected to the second data line and a third buffer amplifier connected to the third data line may output a data voltage corresponding to the lowest grayscale, where the plurality of buffer amplifiers includes the first, second, and third buffer amplifiers. When the second switch is in the closed state during the second sensing period, the first switch and the third switch may be in the open state, the second buffer amplifier may be in the high impedance (Hi-z) state, and the first buffer amplifier and the third buffer amplifier may output the data voltage corresponding to the lowest grayscale. When the third switch is in the closed state during the second sensing period, the first switch and the second switch may be in the open state, the third buffer amplifier may be in the high impedance (Hi-z) state, and the first buffer amplifier and the second buffer amplifier may output the data voltage corresponding to the lowest grayscale.

The display device may further include a timing controller which receives first image data from outside, sums the first image data and the compensation data, and supplies second image data to the data driver.

The display device may further include an analog-to-digital converter which is connected between an output terminal of the sensor and the timing controller and converts the difference value between the first sensing signal and the second sensing signal from an analog form to a digital form.

The display panel may further include scan lines, sensing control lines, a first power source line, and a second power source line, and the each of the pixels may include a first transistor including a first electrode connected to the first power source line, a gate electrode connected to a first node, and a second electrode connected to a second node; a second transistor including a first electrode connected to a data line of the data lines, a second electrode connected to the first node, and a gate electrode connected to a scan line of the scan lines; a third transistor including a first electrode connected to the second node, a second electrode connected to a sensing line of the sensing lines, and a gate electrode connected to a sensing control line of the sensing control lines; a storage capacitor connected between the first node and the second node; and a light emitting element connected between the second node and the second power source line.

The first transistor and the third transistor may be turned on during at least some of the first sensing period and the second sensing period.

The sensor may further include an initialization switch connected between an initialization power source and the sensing line; and a sensing capacitor connected between the sensing line and a reference power source.

The sensing capacitor may be charged by a current provided through the second node when the initialization switch is in the open state and the third transistor is turned on.

The display device may further include a power source stabilization capacitor connected between the reference power source and a first electrode connected to the output terminal of the global amplifier.

In order to solve the above technical problem, according to an embodiment of the present invention, a driving method of a display device including a display panel including a plurality of pixels connected to data lines and sensing lines, include: supplying a first sensing voltage to the data lines by a plurality of buffer amplifiers in a data driver during a first sensing period; receiving a first sensing signal from the pixels through the sensing lines by a sensor in the data driver during the first sensing period; supplying a second sensing voltage to the data lines from a global amplifier during a second sensing period different from the first sensing period; receiving a second sensing signal corresponding to the second sensing voltage from the pixels through the sensing lines by the sensor in the data driver during the second sensing period; and generating compensation data based on a difference value between the first sensing signal and the second sensing signal by the sensor in the data driver.

The second sensing voltage may have the same value as the first sensing voltage, and the second sensing signal may have a greater value than the first sensing signal.

Each of the pixels may include a first sub-pixel connected to a first data line among the data lines, a second sub-pixel connected to a second data line among the data lines, and a third sub-pixel connected to a third data line among the data lines, and an output terminal of the global amplifier may be connected to the first data line through a first switch, connected to the second data line through a second switch, and connected to the third data line through a third switch.

The each of the first switch, the second switch, and the third switch may be in an open state during the first sensing period.

The supplying the second sensing voltage may include: during a first part of the second sensing period, turning on the first switch, turning off the second switch and the third switch, operating a first buffer amplifier connected to the first data line to be in a high impedance (Hi-z) state, and outputting a data voltage corresponding to the lowest grayscale through a second buffer amplifier connected to the second data line and a third buffer amplifier connected to the third data line; during a second part of the second sensing period, turning on the second switch, turning off the first switch and the third switch, operating the second buffer amplifier to be in the high impedance (Hi-z) state, and outputting the data voltage corresponding to the lowest grayscale through the first buffer amplifier and the third buffer amplifier; and during a third part of the second sensing period, turning on the third switch, turning off the first switch and the second switch, operating the third buffer amplifier to be in the high impedance (Hi-z) state, and outputting the data voltage corresponding to the lowest grayscale through the first buffer amplifier and the second buffer amplifier, where the plurality of buffer amplifiers includes the first, second, and third buffer amplifiers.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
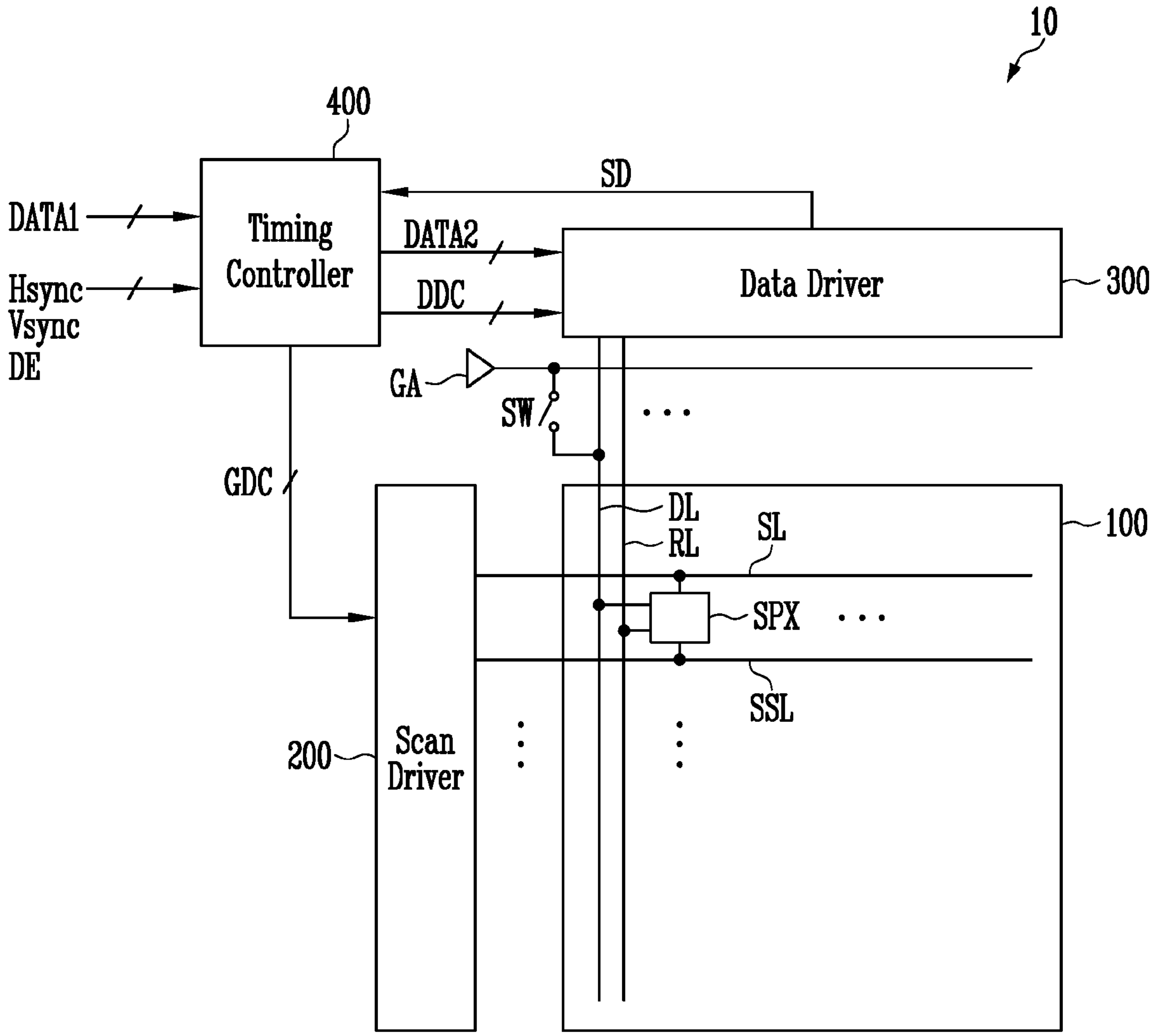
FIG. 1 is a block diagram illustrating a display device according to an embodiment of the present invention.

Hereinafter, exemplary embodiments of the present invention will be described in detail with reference to the accompanying drawings. The same reference numerals are used for the same elements in the drawings, and duplicate descriptions for the same elements are omitted.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram illustrating a display device according to an embodiment of the present invention.

Referring to FIG. 1, a display device 10 may include a display panel 100, a scan driver 200, a data driver 300, a timing controller 400, and a global amplifier GA.

The display panel 100 may include scan lines SL, sensing control lines SSL, data lines DL, sensing lines RL (or readout lines), and sub-pixels SPX.

The sub-pixels SPX may be positioned in areas partitioned by the scan lines SL, the sensing control lines SSL, the data lines DL, and the sensing lines RL, respectively. The display panel 100 may include a plurality of pixels. For example, each of the plurality of pixels may be connected to one data line DL and one sensing line RL. A detailed configuration of each sub-pixel SPX will be described later with reference to FIG. 2.

The timing controller 400 may generate a data control signal DDC for controlling an operation timing of the data driver 300 and a scan control signal GDC for controlling an operation timing of the scan driver 200 based on timing signals such as a vertical synchronization signal Vsync, a horizontal synchronization signal Hsync, and a data enable signal DE. The timing controller 400 may temporally separate a period in which image display is performed and a period (or sensing period) in which external compensation is performed, and may differently generate control signals DDC and GDC for the image display and for the external compensation.

The external compensation may be a technique of sensing driving characteristics of a light emitting element and/or a driving transistor included in each sub-pixel SPX, and correcting input data (i.e., first data DATA1) according to the obtained sensing value. The driving characteristics of the light emitting element may mean an operating point voltage of the light emitting element. Here, the operating point voltage of the light emitting element refers to a threshold voltage for the light emitting element to emit light. The driving characteristics of the driving transistor may mean a threshold voltage of the driving transistor and an electron mobility of the driving transistor.

In addition, the timing controller 400 may generate frame data (i.e., second data DATA2) by rearranging the input data DATA1 provided from an external device (for example, a graphic processor). According to an embodiment, the timing controller 400 may generate clock embedded data by inserting a clock training signal (or clock training pattern) into the frame data. Here, the clock training signal may be used by the data driver 300 to restore a clock signal. For example, the clock training signal may include a value corresponding to a square wave in the same manner as the clock signal. For example, the timing controller 400 may insert the clock training signal between the frame data and adjacent frame data.

The timing controller 400 may provide the second data DATA2 to the data driver 300.

The scan driver 200 and the data driver 300 may drive the display panel 100.

The scan driver 200 may receive the scan control signal GDC from the timing controller 400 and generate a scan signal and a sensing control signal (or sensing scan signal) based on the scan control signal GDC. The scan driver 200 may provide the scan signal to the scan lines SL and may provide the sensing control signal to the sensing control lines SSL.

The data driver 300 may receive the data control signal DDC and the second data DATA2 from the timing controller 400. The data driver 300 may restore the clock signal based on the clock training signal of the clock embedded data, and may restore the frame data from the clock embedded data based on the clock signal.

In addition, the data driver 300 may generate a data signal corresponding to the second data DATA2 and provide the data signal to the data lines DL in a display period (or frame period) in which an image is displayed on the display panel 100.

In a first sensing period among the sensing period for sensing characteristic information of the sub-pixel SPX (for example, the threshold voltage and/or mobility of the driving transistor included in the sub-pixel SPX), the data driver 300 may provide a first sensing voltage V1 (See FIG. 5) to the sub-pixels SPX through a buffer amplifier unit (not shown), and receive a first sensing signal corresponding to the first sensing voltage V1 from at least one of the sub-pixels SPX through the sensing lines RL.

In an embodiment, for example, the sensing period may be a vertical blank period (or vertical porch period) between adjacent display periods (for example, different frame periods). During the sensing period, the data driver 300 may receive a sensing signal (for example, the mobility of the driving transistor or a signal related thereto) from the sub-pixel SPX. As another example, the sensing period may be a period immediately before the display device 10 is powered off, and the data driver 300 may sequentially receive sensing signals (for example, the threshold voltage of the driving transistor of each of the pixels) from the pixels including the sub-pixel SPX in units of pixel rows.

The global amplifier GA may be connected to the data lines DL positioned between the display panel 100 and the data driver 300. According to an embodiment, an output terminal of the global amplifier GA may be connected to the plurality of data lines DL through switches SW, and may provide a second sensing voltage V2 (See FIG. 5) to the sub-pixels SPX through the data lines DL in a second sensing period different from the first sensing period. In this case, the data driver 300 may receive a second sensing signal corresponding to the second sensing voltage V2 from at least one of the sub-pixels SPX through the sensing lines RL.

The timing controller 400 may receive compensation data SD according to an external compensation operation from the data driver 300. The timing controller 400 may generate the second data DATA2 by correcting the first data DATA1 based on the compensation data SD so that deviation in deterioration of the driving transistor between the pixels PXL and/or deviation in deterioration of the light emitting element between the pixels PXL is compensated. The timing controller 400 may transmit the second data DATA2 which corresponds to the corrected first data DATA1 in the display period for displaying the image to the data driver 300.

The compensation data SD may be generated based on the first sensing signal and the second sensing signal. A detailed method of calculating the first sensing signal and the second sensing signal will be described later in detail with reference to FIGS. 3 to 6B.

Figure 2:
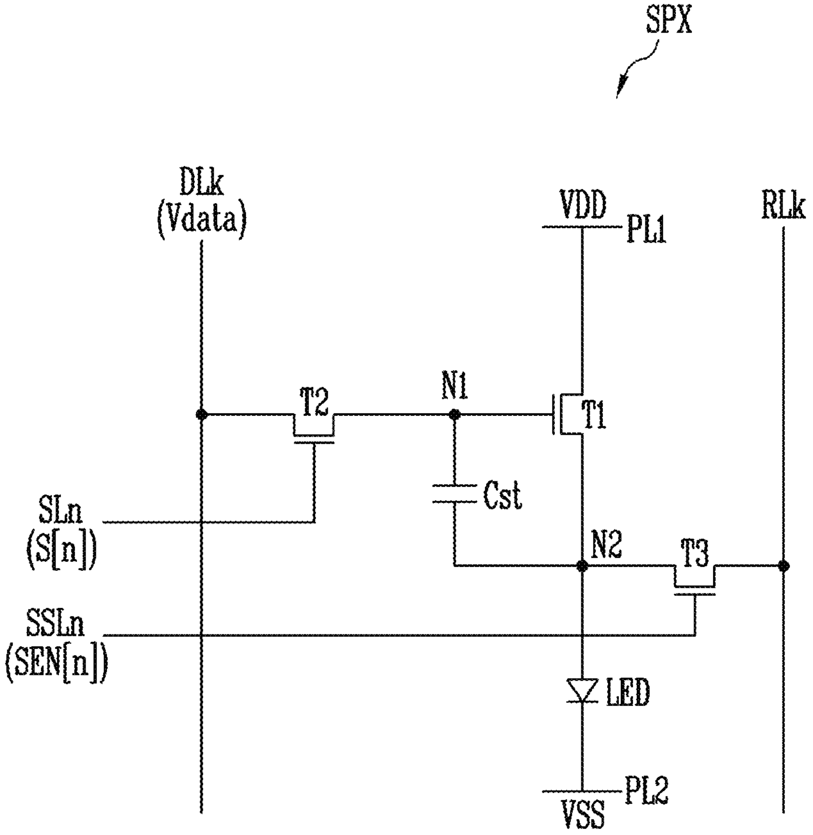
FIG. 2 is a circuit diagram illustrating an example of a sub-pixel included in the display device of FIG. 1.

FIG. 2 is a circuit diagram illustrating an example of a sub-pixel included in the display device of FIG. 1. In FIG. 2, a sub-pixel SPX included in an n-th pixel row and a k-th pixel column is shown as an example, where n and k may be positive integers.

Referring to FIG. 2, the sub-pixel SPX may be connected to an n-th scan line SLn, a k-th data line DLk, an n-th sensing control line SSLn, and a k-th sensing line RLk.

The sub-pixel SPX may include a light emitting element LED, a first transistor T1 (a driving transistor), a second transistor T2 (a switching transistor), a third transistor T3 (a sensing transistor), and a storage capacitor Cst.

An anode electrode of the light emitting element LED may be connected to a second node N2 (i.e., a second electrode of the first transistor T1), and a cathode electrode of the light emitting element LED may be connected to a second power source line PL2 to which a second power source voltage VSS is applied. The light emitting element LED may generate light with a predetermined luminance in response to the amount of current (or driving current) supplied from the first transistor T1. The light emitting element LED may be an organic light emitting diode. However, the present invention is not limited thereto, and the light emitting element LED may include an inorganic light emitting diode in another embodiment.

In addition, the light emitting element LED may be an element including organic and inorganic materials in combination. Additionally, in FIG. 2, the sub-pixel SPX is shown to include a single light emitting element LED. However, in another embodiment, the sub-pixel SPX may include a plurality of light emitting elements LED, and the plurality of light emitting elements LED may be connected to each other in series, in parallel, or in series and parallel.

The first transistor T1 may include a first electrode connected to a first power source line PL1 to which a first power source voltage VDD is applied, and the second electrode connected to the second node N2 (i.e., the anode electrode of the light emitting element LED). A gate electrode of the first transistor T1 may be connected to a first node N1. The first transistor T1 may control the amount of current flowing to the light emitting element LED in response to a voltage of the first node N1.

The second transistor T2 may include a first electrode connected to the k-th data line DLk, and a second electrode connected to the first node N1. A gate electrode of the second transistor T2 may be connected to the n-th scan line SLn. When a scan signal S[n] is supplied to the n-th scan line SLn, the second transistor T2 may be turned on to transfer a data voltage Vdata (i.e., data signal) from the k-th data line DLk to the first node N1. In this case, the first sensing voltage V1 may be output from a buffer amplifier BF (refer to FIG. 3) as the data voltage Vdata during the first sensing period, and the second sensing voltage V2 may be output from the global amplifier GA (refer to FIG. 1) as the data voltage Vdata during the second sensing period.

The storage capacitor Cst may be connected between the first node N1 and the anode electrode of the light emitting element LED. The storage capacitor Cst may store the voltage of the first node N1.

The third transistor T3 may be connected between the k-th sensing line RLk and the second node N2 (i.e., the second electrode of the first transistor T1). A gate electrode of the third transistor T3 may be connected to the n-th sensing control line SSLn. When a sensing control signal SEN[n] is supplied to the n-th sensing control line SSLn, the third transistor T3 may be turned on to electrically connect the k-th sensing line RLk and the second node N2.

According to an embodiment, the sensing control signal SEN[n] may be applied at the same time as the scan signal S[n]. During at least some of the first sensing period and the second sensing period, the second transistor T2 and the third transistor T3 may be maintained in a turned-on state. The third transistor T3 may connect the second node N2 and the k-th sensing line RLk in response to the sensing control signal SEN[n]. In this case, the sensing signal may be provided to the k-th sensing line RLk. Here, the sensing signal may be set as a sensing voltage applied to the second node N2 and/or a sensing current supplied to the second node N2.

The sensing signal may be provided to the data driver 300 (refer to FIG. 1) through the k-th sensing line RLk.

In the sensing period, the sub-pixel SPX (or the light emitting element LED) may emit light according to a gate-source voltage of the first transistor T1. In particular, when the sensing period corresponds to the vertical blank period, the sub-pixel SPX may emit light with undesired luminance in the vertical blank period.

Accordingly, the display device 10 (refer to FIG. 1) may suppress light emission of the sub-pixel SPX by changing the second power source voltage VSS, for example, increasing the voltage level of the second power source voltage VSS. However, the present invention is not limited thereto.

In the embodiment of the present invention, the sub-pixel SPX is not limited to the circuit structure shown in FIG. 2. For example, in FIG. 2, each of the first transistor T1, the second transistor T2, and the third transistor T3 is shown as an N-type transistor, but at least one of the first transistor T1, the second transistor T2, and the third transistor T3 may be formed of a P-type transistor in another embodiment.

Figure 3:
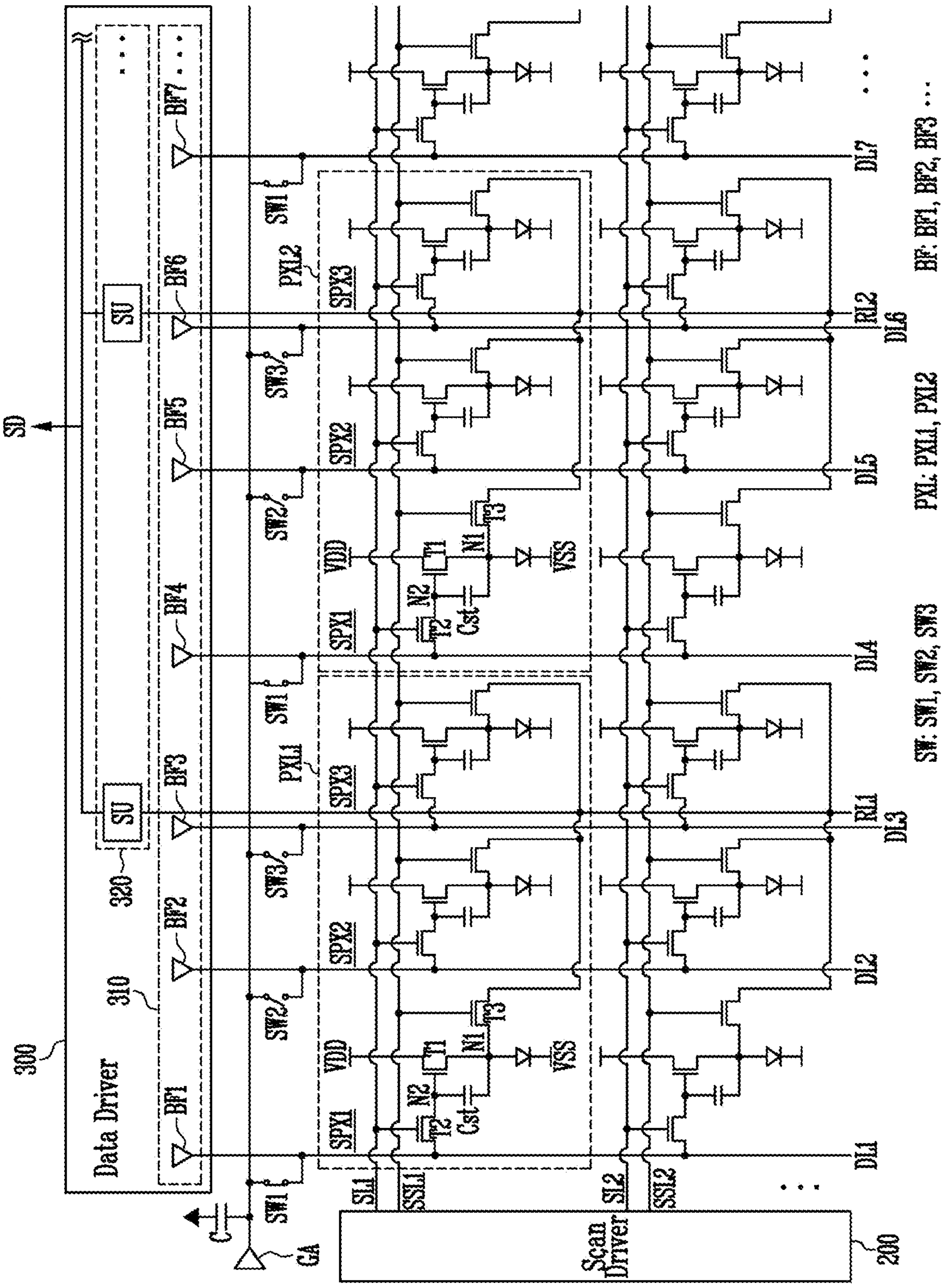
FIG. 3 is a diagram for explaining an operation between a pixel, a data driver, and a global amplifier during a sensing period. In this case, a data driver 300 may include at least one source driver integrated circuit ("IC") (not shown).

FIG. 3 is a diagram for explaining an operation between a pixel, a data driver, and a global amplifier during a sensing period. In this case, the data driver 300 may include at least one source driver integrated circuit (IC) (not shown). In FIG. 3, for convenience of explanation, only one source driver IC will be described as an example.

Referring to FIG. 3, the data driver 300 may include a signal output unit 310 and a sensor 320. In this case, the sensor 320 may be a reference number for referring to a plurality of sensors SU.

According to an embodiment of the present invention, the sensor SU may receive the first sensing signal from a pixel PXL1, PXL2 in response to the first sensing voltage V1 output from buffer amplifiers BF during the first sensing period. Also, the sensor SU may receive the second sensing signal from the pixel PXL1, PXL2 in response to the second sensing voltage V2 output from the global amplifier GA during the second sensing period. The sensor SU receiving the first sensing signal and the second sensing signal may generate the compensation data SD based on a difference value between the first sensing signal and the second sensing signal. In this case, the first sensing period and the second sensing period are only for differentiating sensing voltages input to the pixel PXL1, PXL2, and do not define a relationship between the preceding and following in time. That is, the second sensing period may precede the first sensing period.

A first pixel PXL1 may include a first sub-pixel SPX1 connected to a first data line DL1, a second sub-pixel SPX2 connected to a second data line DL2, and a third sub-pixel SPX3 connected to a third data line DL3. In addition, a second pixel PXL2 may include the first sub-pixel SPX1 connected to a fourth data line DL4, the second sub-pixel SPX2 connected to a fifth data line DL5, and the third sub-pixel SPX3 connected to a sixth data line DL6. For example, the first sub-pixel SPX1 may be a red pixel emitting red light, the second sub-pixel SPX2 may be a green pixel emitting green light, and the third sub-pixel SPX3 may be a blue pixel emitting blue light. However, the configuration of the pixel PXL1, PXL2 is not limited thereto. In another embodiment, for example, the pixel PXL1, PXL2 may further include a sub-pixel emitting white light.

Each of the first sub-pixel SPX1, the second sub-pixel SPX2, and the third sub-pixel SPX3 may be connected to one of the plurality of sensing lines. According to an embodiment, the first sub-pixel SPX1, the second sub-pixel SPX2, and the third sub-pixel SPX3 included in the first pixel PXL1 may be connected to one sensing line, that is, a first sensing line RL1. The first sub-pixel SPX1, the second sub-pixel SPX2, and the third sub-pixel SPX3 included in the second pixel PXL2 may be connected to a second sensing line RL2. That is, the plurality of sub-pixels SPX1, SPX2, and SPX3 constituting each of the pixels PXL1 and PXL2 may be independently connected to a sensing line which is different from a sensing line connected to the sub pixels of another pixel.

The output terminal of the global amplifier GA may be connected to the first data line DL1 through a first switch SW1, connected to the second data line DL2 through a second switch SW2, and connected to the third data line DL3 through a third switch SW3. In addition, the output terminal of the global amplifier GA may be connected to the fourth data line DL4 through the first switch SW1, connected to the fifth data line DL5 through the second switch SW2, and connected to the sixth data line DL6 through the third switch SW3. According to an embodiment of the present invention, first switches SW1 connected to first sub-pixels SPX1 may be opened and closed at the same time, second switches SW2 connected to second sub-pixels SPX2 may be opened and closed at the same time, and third switches SW3 connected to third sub-pixels SPX3 may be opened and closed at the same time.

The sensor SU may receive the first sensing signal from the pixel PXL1, PXL2 in response to the first sensing voltage V1 output from the buffer amplifiers BF during the first sensing period. In this case, all of the first switch SW1, the second switch SW2, and the third switch SW3 may be turned off during the first sensing period. That is, since all of the first to third switches SW1, SW2, and SW3 are in an open state during the first sensing period, no signal may be received from the global amplifier GA.

The sensor SU may receive the second sensing signal from the pixel PXL1, PXL2 in response to the second sensing voltage V2 output from the global amplifier GA during the second sensing period.

According to an embodiment of the present invention, the second sensing signal may be sequentially received in the order of the first sub-pixels SPX1, the second sub-pixels SPX2, and the third sub-pixels SPX3 connected to the same pixel row.

In an embodiment, for example, during a first part of the second sensing period, the first switch SW1 may be turned on (i.e., in the closed state), and the second switch SW2 and the third switch SW3 may be turned off (i.e., in the open state). At this time, a first buffer amplifier BF1 connected to the first data line DL1 may be in a high impedance (Hi-z) state, and a second buffer amplifier BF2 connected to the second data line DL2 and a third buffer amplifier BF3 connected to the third data line DL3 may output a data voltage (or black data) corresponding to the lowest grayscale. The “high impedance (Hi-z) state” refers to an output signal state in which the signal is substantially not being driven due to high impedance. Since the first buffer amplifier BF1 is in the high impedance (Hi-z) state, substantially, the first buffer amplifier BF1 may be in the open state. Therefore, only the second sensing voltage V2 output from the global amplifier GA may be input through the first data line DL1.

Next, during a second part of the second sensing period, the second switch SW2 may be turned on (i.e., in the closed state), and the first switch SW1 and the third switch SW3 may be turned off (i.e., in the open state). At this time, the second buffer amplifier BF2 connected to the second data line DL2 may be in the high impedance (Hi-z) state, and the first buffer amplifier BF1 connected to the first data line DL1 and the third buffer amplifier BF3 connected to the third data line DL3 may output the data voltage (or the black data) corresponding to the lowest grayscale. Since the second buffer amplifier BF2 is in the high impedance (Hi-z) state, substantially, the second buffer amplifier BF2 may be in the open state. Therefore, only the second sensing voltage V2 output from the global amplifier GA may be input through the second data line DL2.

Thereafter, during a third part of the second sensing period, the third switch SW3 may be turned on (i.e., in the closed state), and the first switch SW1 and the second switch SW2 may be turned off (i.e., in the open state). The third buffer amplifier BF3 connected to the third data line DL3 may be in the high impedance (Hi-z) state, and the first buffer amplifier BF1 connected to the first data line DL1 and the second buffer amplifier BF2 connected to the second data line DL2 may output the data voltage (or the black data) corresponding to the lowest grayscale. Since the third buffer amplifier BF3 is in the high impedance (Hi-z) state, substantially, the third buffer amplifier BF3 may be in the open state. Therefore, only the second sensing voltage V2 output from the global amplifier GA may be input through the third data line DL3.

A power source stabilization capacitor C connected between a reference power source (or ground) a first electrode connected to the output terminal of the global amplifier GA may be further included. The power source stabilization capacitor C may maintain a voltage of the output terminal of the global amplifier GA.

Figure 4:
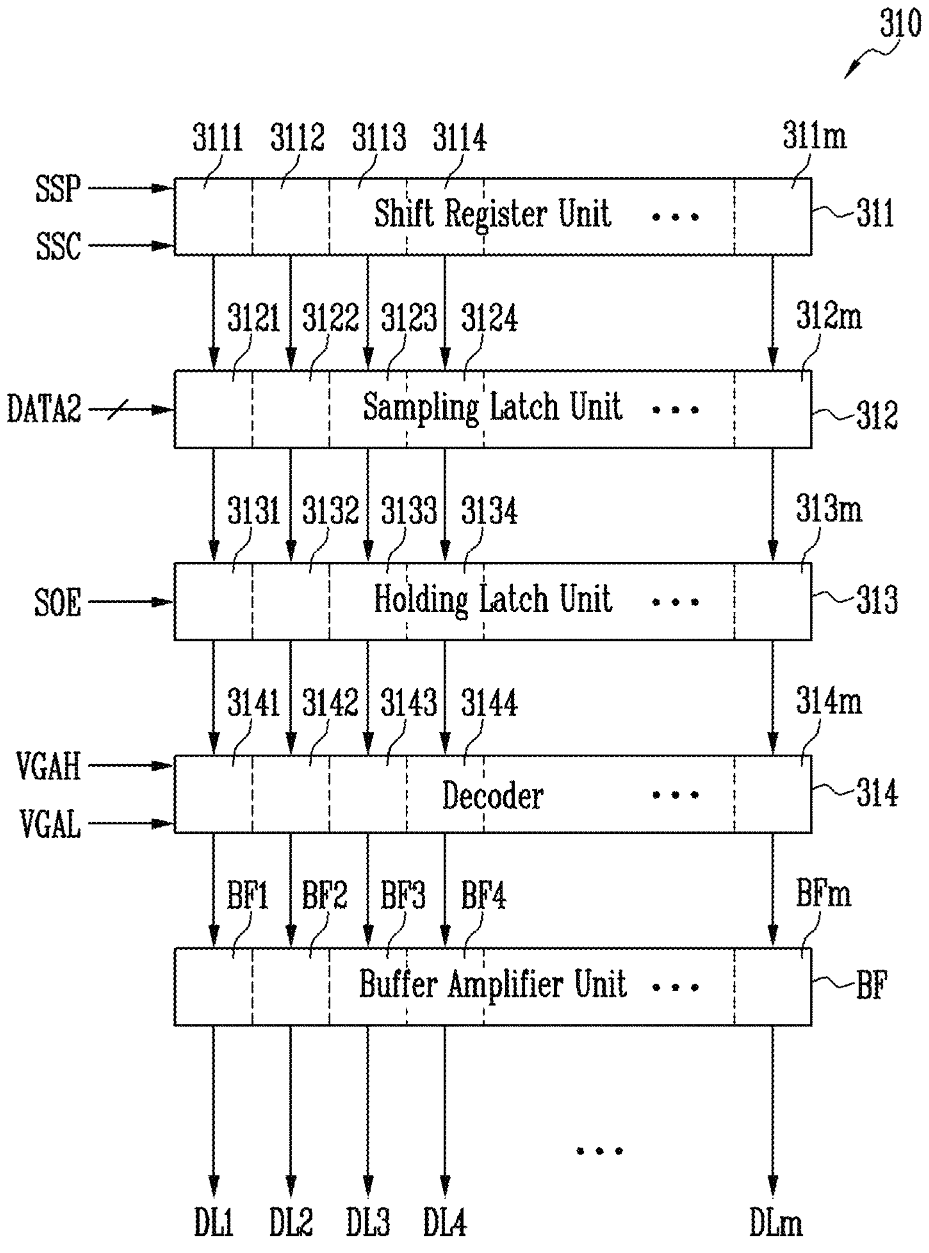
FIG. 4 is a detailed circuit diagram of a signal output unit of the data driver of FIG. 3 according to an embodiment of the present invention.

FIG. 4 is a detailed circuit diagram of a signal output unit of the data driver of FIG. 3 according to an embodiment of the present invention.

Referring to FIG. 4, the signal output unit 310 may include a shift register unit 311, a sampling latch unit 312, a holding latch unit 313, a decoder 314, and a buffer amplifier unit BF.

The shift register unit 311 may sequentially generate m sampling signals in response to a source start pulse SSP and a source shift clock SSC output from the timing controller 400, where m may be a natural number greater than 0. Specifically, the shift register unit 311 may sequentially generate the m sampling signals while shifting the source start pulse SSP every one cycle of the source shift clock SSC. The shift register unit 311 may be implemented with m shift registers 3111 to 311*m*.

The sampling latch unit 312 may sequentially store the second data DATA2 in response to the sampling signals sequentially supplied from the shift register unit 311. The sampling latch unit 312 may be implemented with m sampling latches 3121 to 312*m* for storing m second data DATA2.

The holding latch unit 313 may store the second data DATA2 supplied from the sampling latch unit 312 in response to a source output enable signal SOE output from the timing controller 400. The holding latch unit 313 may supply the second data DATA2 stored therein to the decoder 314. The holding latch unit 313 may be implemented with m holding latches 313*l* to 313*m*.

The decoder 314 may convert the second data DATA2 output from the holding latch unit 313 into an analog signal and output the converted analog signal to the buffer amplifier unit BF as the data signal. The decoder 314 may select a plurality of grayscale voltages from a minimum grayscale gamma voltage VGAL and a maximum grayscale gamma voltage VGAH based on the second data DATA2 output from the holding latch unit 313. The decoder 314 may include m digital-analog converters 3141 to 314*m*. That is, the decoder 314 may generate m data signals using the digital-analog converters 3141 to 314*m* disposed for each channel, and supply the generated data signals to the buffer amplifier BF.

The buffer amplifier unit BF may supply the m data signals supplied from the decoder 314 to m data lines DL1 to DLm. The buffer amplifier unit BF may be implemented with m buffer amplifiers BF1 to BFm.

Figure 5:
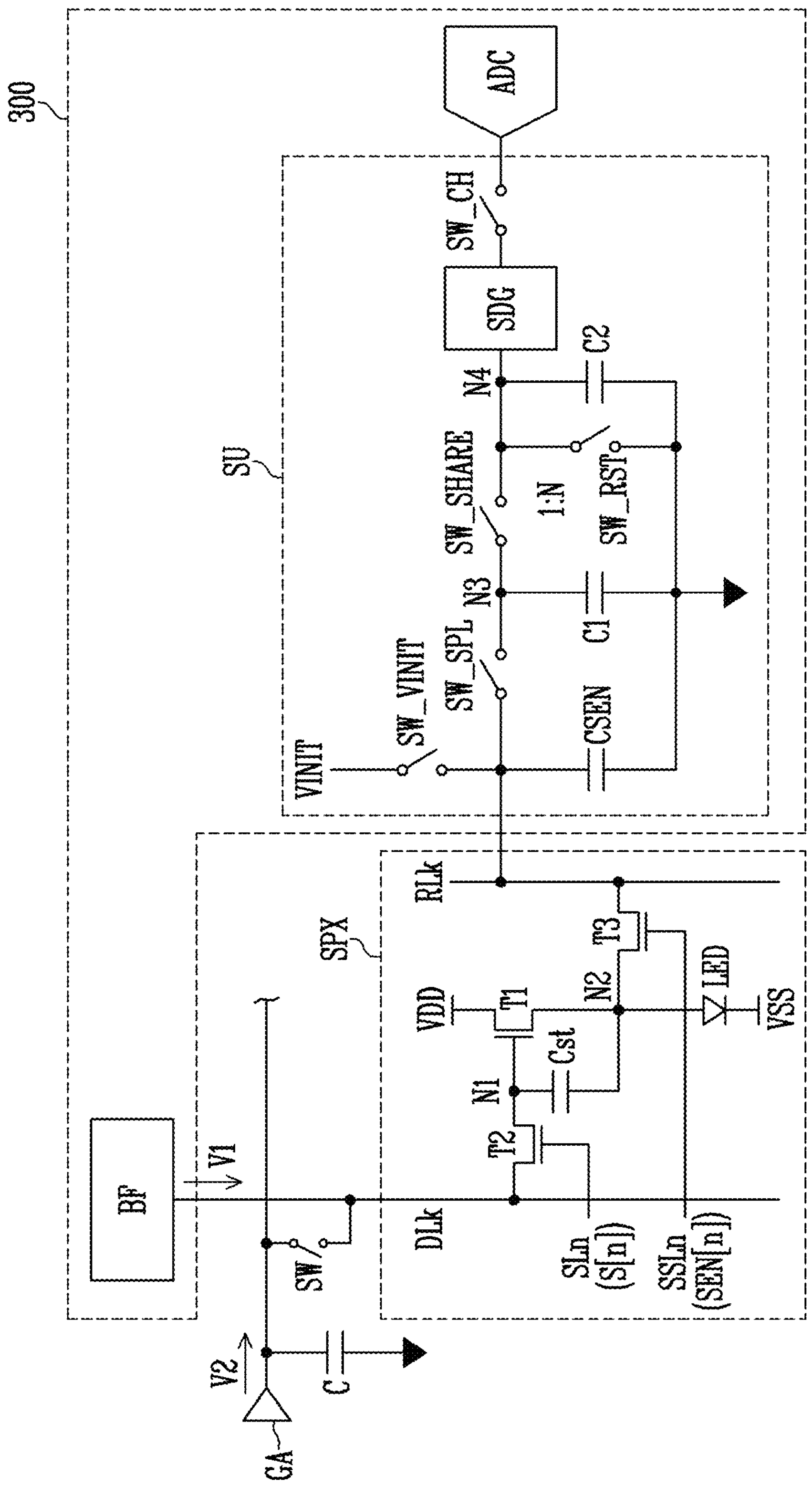
FIG. 5 is a circuit diagram illustrating a sensor of FIG. 3 according to an embodiment of the present invention.
Figure 6A:
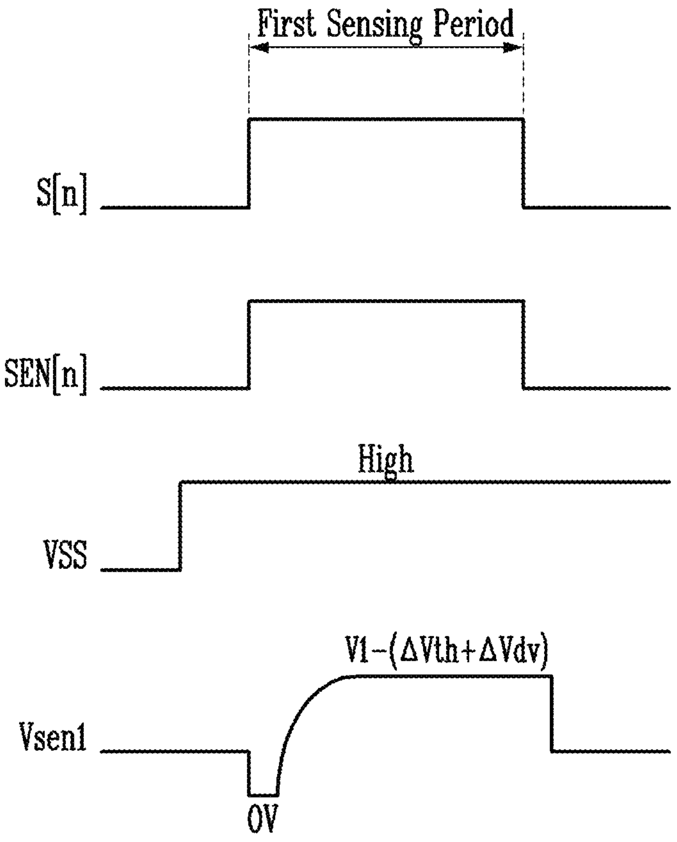
FIG. 6A is a waveform diagram illustrating a voltage value of a sensing signal stored in a sensing capacitor in a first sensing period.
Figure 6B:
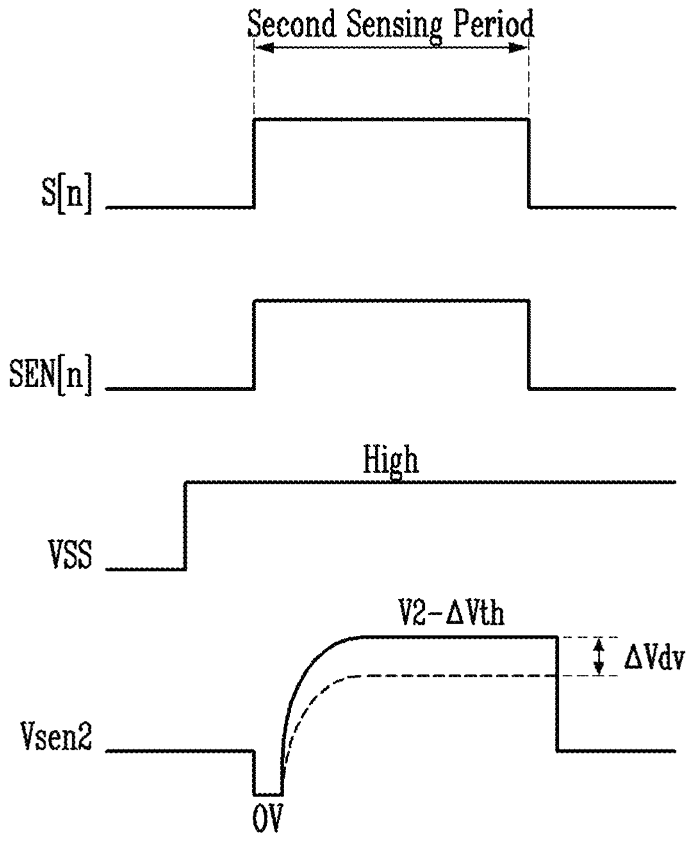
FIG. 6B is a waveform diagram illustrating the voltage value of the sensing signal stored in the sensing capacitor in a second sensing period.

FIG. 5 is a circuit diagram illustrating a sensor of FIG. 3 according to an embodiment of the present invention. FIG. 6A is a waveform diagram illustrating a voltage value of a sensing signal stored in a sensing capacitor in a first sensing period. FIG. 6B is a waveform diagram illustrating the voltage value of the sensing signal stored in the sensing capacitor in a second sensing period. FIG. 5 schematically shows a part of the data driver 300 connected to the sub-pixel SPX through the k-th sensing line RLk in order to sense the characteristics of the sub-pixel SPX.

Referring to FIGS. 1, 2, 4 and 5, since the sub-pixel SPX is substantially the same as the sub-pixel SPX described with reference to FIG. 2 and a buffer amplifier is substantially the same as the buffer amplifier unit BF described with reference to FIG. 4, duplicate descriptions will be omitted.

According to an embodiment of the present invention, in the first sensing period among the sensing periods for sensing the characteristic information of the sub-pixel SPX, the buffer amplifier unit BF may provide the first sensing voltage V1 to the sub-pixels SPX through the data lines DL (e.g., DLk), and the sensor SU may receive the first sensing signal corresponding to the first sensing voltage V1 from at least one of the sub-pixels SPX through the sensing lines RL (e.g., RLk).

In addition, in the second sensing period, the global amplifier GA may provide the second sensing voltage V2 to the sub-pixels SPX through the data lines DL (e.g., DLk), and the sensor SU may receive the second sensing signal corresponding to the second sensing voltage V2 from at least one of the sub-pixels SPX through the sensing lines RL (e.g., RLk).

The data driver 300 may include the buffer amplifier unit BF and the sensor SU.

The buffer amplifier unit BF may receive a data voltage corresponding to a data value (i.e., grayscale data) included in the frame data (i.e., the second data DATA2) from the digital-to-analog converters 314*l* to 314*m* of the decoder 314 (refer to FIG. 4). The buffer amplifier unit BF may provide the data voltage to the k-th data line DLk.

The sensor SU may include a sensing capacitor CSEN, a first capacitor C1, a second capacitor C2, an initialization switch SW_VINIT, a sampling switch SW_SPL, a sharing switch SW_SHARE, a reset switch SW_RST, an output switch SW_CH, and a compensation data calculation unit SDG.

The initialization switch SW_VINIT may be connected between a power source line to which an initialization voltage VINIT is applied and the k-th sensing line RLk. Here, the initialization voltage VINIT may be provided from a separate power source supply unit and may have a voltage level lower than the operating point voltage of the light emitting element LED. When the initialization switch SW_VINIT is turned on, the initialization voltage VINIT may be applied to the k-th sensing line RLk, and then when the third transistor T3 of the sub-pixel SPX is turned on, the initialization voltage VINIT may be applied to the second node N2 of the sub-pixel SPX. Since the initialization voltage VINIT has the voltage level lower than the operating point voltage of the light emitting element LED, the light emitting element LED may not emit light even when the first transistor T1 is turned on.

The sensing capacitor CSEN may be connected between the k-th sensing line RLk and the reference power source (e.g., ground). The reference power source may have the ground voltage, but the present invention is not limited thereto. When the initialization switch SW_VINIT is turned off and the third transistor T3 of the sub-pixel SPX is turned on, the sensing capacitor CSEN may be charged by a current provided through the second node N2. That is, the characteristic information of the sub-pixel SPX provided through the second node N2 may be stored in the sensing capacitor CSEN.

Referring to FIG. 6A, in the first sensing period, a voltage Vsen1 (i.e., a voltage of the first sensing signal) stored at the sensing capacitor CSEN may be a value obtained by subtracting the sum of a threshold voltage ΔVth of the first transistor T1 (i.e., the driving transistor) and a voltage deviation ΔVdv of the buffer amplifier unit BF from a first sensing voltage V1. That is, $Vsen1=V1-(\Delta Vth+\Delta Vdv)$. In this case, the voltage deviation ΔVdv of the buffer amplifier unit BF may mean a voltage deviation caused by a difference in specifications between the plurality of buffer amplifiers BF1 to BFm. For example, the plurality of buffer amplifiers BF1 to BFm may have a difference in gain due to process deviation in a manufacturing process. Accordingly, output voltages of the buffer amplifiers BF1 to BFm may increase or decrease.

Referring to FIG. 6B, in the second sensing period, a voltage Vsen2 (i.e., a voltage of the second sensing signal) stored at the sensing capacitor CSEN may be a value by subtracting the threshold voltage ΔVth of the first transistor T1 (i.e., the driving transistor) from a second sensing voltage V2. That is, Vsen2=V2−ΔVth. When the second sensing voltage V2 having the same level is supplied to the plurality of sub-pixels SPX through one global amplifier GA, the voltage deviation ΔVdv may not occur compared to a case in which the first sensing voltage V1 is supplied through the plurality of buffer amplifiers BF1 to BFm.

The first sensing voltage V1 may have the same value as the second sensing voltage V2. For example, the buffer amplifier unit BF and the global amplifier GA may receive the same analog signal output from the same decoder 314 shown in FIG. 4.

When the first sensing voltage V1 and the second sensing voltage V2 have the same magnitude, the voltage stored at the sensing capacitor CSEN (i.e., the voltage of the second sensing signal) in the second sensing period may be greater than the voltage stored at the sensing capacitor CSEN (i.e., the voltage of the first sensing signal) in the first sensing period.

The sampling switch SW_SPL may be connected between the k-th sensing line RLk and a third node N3. The first capacitor C1 may be connected between the third node N3 and the reference power source (e.g., ground). While the sampling switch SW_SPL is turned on, the first capacitor C1 may sample the characteristic information of the sub-pixel SPX (i.e., the first transistor T1) stored in the sensing capacitor CSEN. That is, the data driver 300 may sample the sensing signal through the sampling switch SW_SPL and the first capacitor C1.

The sharing switch SW_SHARE may be connected between the third node N3 and a fourth node N4. The reset switch SW_RST may be connected between the fourth node N4 and the reference power source. The second capacitor C2 may be connected between the fourth node N4 and the reference power source. When the sharing switch SW_SHARE is turned on and the first capacitor C1 and the second capacitor C2 share charge, a node voltage of the fourth node N4 (and a node voltage of the third node N3) may be changed. According to an operation of the sharing switch SW_SHARE and the reset switch SW_RST, the sharing switch SW_SHARE, the reset switch SW_RST, and the second capacitor C2 may function as a buffer. Here, although it varies depending on a ratio of the capacitance of the first capacitor C1 and the second capacitor C2, a gain of the buffer may be N, where N may be an integer greater than 1. That is, the sharing switch SW_SHARE, the reset switch SW_RST, and the second capacitor C2 may amplify the node voltage of the third node N3 by the gain N.

The compensation data calculation unit SDG may be connected between the fourth node N4 and the output switch SW_CH. The compensation data calculation unit SDG may receive the voltage (i.e., the voltage of the first sensing signal) stored at the sensing capacitor CSEN in the first sensing period, and may receive the voltage stored at the sensing capacitor CSEN (i.e., the voltage of the second sensing signal) in the second sensing period. The compensation data calculation unit SDG may calculate a difference value between the voltage of the received first sensing signal and the voltage of the received second sensing signal.

The output switch SW_CH may be connected between an output terminal of the compensation data calculation unit SDG and an analog-to-digital converter ADC, and may connect the output terminal of the compensation data calculation unit SDG to an input terminal of the analog-to-digital converter ADC. In this case, the difference value between the voltage of the first sensing signal and the voltage of the second sensing signal may be applied to the analog-to-digital converter ADC.

Although not shown, a capacitor connected between the input terminal of the analog-to-digital converter ADC and the reference power source to maintain the node voltage of the fourth node N4 provided to the analog-to-digital converter ADC, and an initialization circuit (for example, a capacitor initialization power source and a switch connecting the same to the input terminal of the analog-to-digital converter ADC) for initializing the input terminal of the analog-to-digital converter ADC (or the capacitor) may be further included.

The analog-to-digital converter ADC may convert a voltage provided to the input terminal into a data value (for example, a digital code). That is, the data driver 300 may convert the sensing signal sampled through the analog-to-digital converter ADC from an analog form to a digital form. The sensing signal in the digital form (i.e., the compensation data SD) may be provided to the timing controller 400.

In FIG. 5, the sensor SU is shown to include the capacitors CSEN, C1, and C2 and the switches SW_VINIT, SW_SPL, SW_SHARE, SW_RST, and SW_CH. However, this is an example, and the present invention is not limited thereto. For example, if the sensor SU can detect the node voltage (or a current corresponding thereto) of the second node N2 of the sub-pixel SPX, various circuits (for example, a sensing circuit for converting a sensing current into a sensing voltage using an amplifier, and sampling and holding the converted sensing voltage) may be applied as the sensor SU in another embodiment.

According to an embodiment of the present invention, only information on threshold voltages ΔVth of the plurality of pixels PXL included in the display panel 100 may be calculated using one global amplifier GA. Therefore, the information on the threshold voltages ΔVth of the plurality of pixels PXL and information on the voltage deviation ΔVdv of the buffer amplifiers BF of the data driver 300 may be independently managed. Accordingly, compensation for the threshold voltages ΔVth of the plurality of pixels PXL and compensation for the voltage deviation ΔVdv of the buffer amplifiers BF of the data driver 300 may be performed, independently. As a result, since the deviation between sensing channels may be reduced, compensation for the display device 10 may be more accurately performed.

Figure 7:
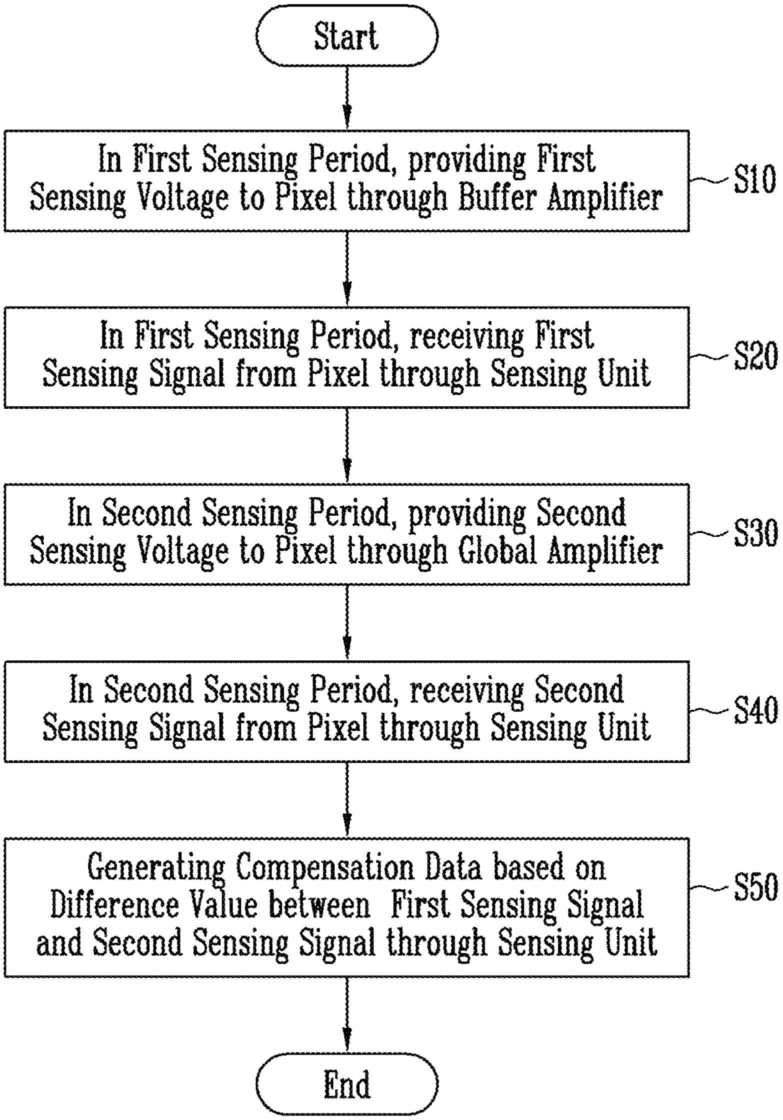
FIG. 7 is a flowchart illustrating a driving method of a display device according to an embodiment of the present invention.
Figure 8:
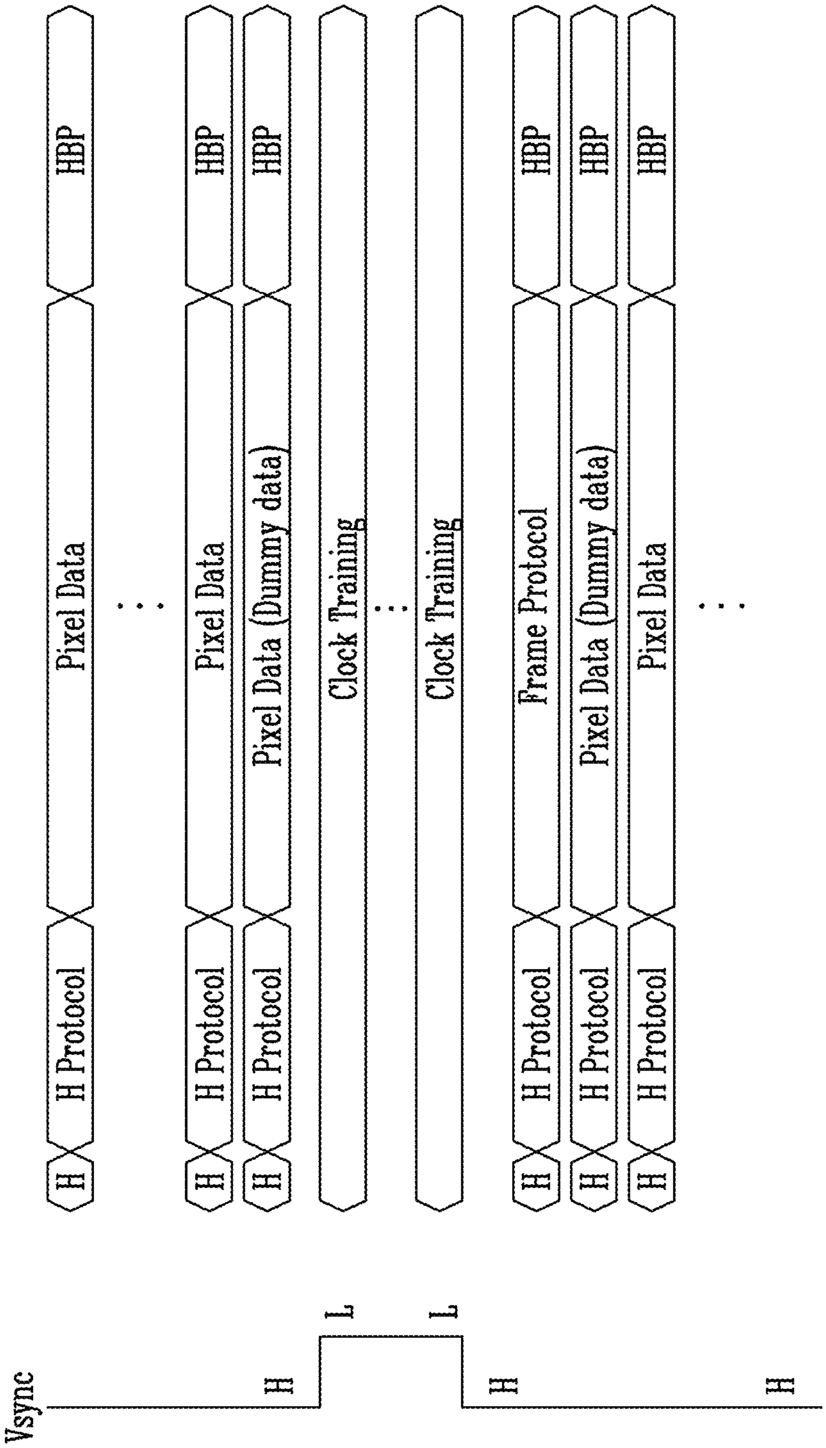
FIG. 8 is a signal diagram illustrating an interface signal of a timing controller according to an embodiment of the present invention.

FIG. 7 is a flowchart illustrating a driving method of a display device according to an embodiment of the present invention. FIG. 8 is a signal diagram illustrating an interface signal of a timing controller according to an embodiment of the present invention.

First, referring to FIGS. 1 and 8, the timing controller 400 may provide the clock embedded data to the data driver 300. The timing controller 400 may transmit the clock embedded data in the form of a packet to the data driver 300 using a serial interface (e.g., a high-speed serial interface).

The timing controller 400 may switch frames in response to a cycle of the vertical synchronization signal Vsync. In this case, "H" may refer to a start point of one horizontal period, and "HBP" may refer to an end point of the one horizontal period. "Pixel Data" may include information on the second data DATA2 in the display period. "Frame Protocol" may include information for determining whether to perform sensing using the buffer amplifier BF or the global amplifier GA in the sensing period. "H Protocol" may include information on whether the display device 10 operates in a display mode or a sensing mode.

During a clock training period, the timing controller 400 may generate the clock embedded data by inserting the clock training signal (or the clock training pattern) into the frame data.

The sensing period may be the vertical blank period (or a low level period of the vertical synchronization signal) between adjacent display periods (for example, the different frame periods). During the sensing period, the data driver 300 may receive the sensing signal (for example, the mobility of the driving transistor, or a signal related thereto) from the pixel PXL. As another embodiment, the sensing period may be a period immediately before the display device 10 is powered off, and the data driver 300 may sequentially receive the sensing signals (for example, the threshold voltage of the driving transistor of each of the pixels) from the pixels including the pixel PXL in units of pixel rows.

Hereinafter, for convenience of description, a case in which the sensing mode is performed in the vertical blank period (or the low level period of the vertical synchronization signal) between adjacent display periods (for example, the different frame periods) will be described as an example with reference to FIGS. 1 to 7.

According to a driving method of the display device 10 including the display panel 100 including the plurality of pixels PXL connected to the data lines DL and the sensing lines RL, first, during the first sensing period, the first sensing voltage V1 may be supplied to the data lines DL by the plurality of buffer amplifiers BF in the data driver 300 (S10).

The first pixel PXL1 may include the first sub-pixel SPX1 connected to the first data line DL1, the second sub-pixel SPX2 connected to the second data line DL2, and the third sub-pixel SPX3 connected to the third data line DL3.

The first sub-pixel SPX1, the second sub-pixel SPX2, and the third sub-pixel SPX3 may be connected to one of the plurality of sensing lines.

The output terminal of the global amplifier GA may be connected to the first data line DL1 through the first switch SW1, connected to the second data line DL2 through the second switch SW2, and connected to the third data line DL3 through the third switch SW3.

During the first sensing period, the first sensing voltage V1 may be output from the bumper amplifier BF as the data voltage Vdata. In the first sensing period, the second transistor T2 may be turned on in response to the scan signal S[n], and the third transistor T3 may be turned on in response to the sensing control signal SEN[n]. In this case, in the first sensing period, the pixel PXL (or the light emitting element LED) may emit light according to the gate-source voltage of the first transistor T1 of the pixel PXL. In particular, when the sensing period corresponds to the vertical blank period VBP described with reference to FIG. 1, the pixel PXL may emit light with undesired luminance in the vertical blank period VBP.

Accordingly, the display device 10 may suppress light emission of the pixel PXL by changing the second power source voltage VSS during the first sensing period, for example, increasing the voltage level of the second power source voltage VSS.

Thereafter, during the first sensing period, the first sensing signal may be received from the pixels PXL through the sensing lines RL by the sensor SU in the data driver 300 (S20).

The sensor SU may receive the first sensing signal from the pixel PXL1, PXL2 in response to the first sensing voltage V1 output from the buffer amplifiers BF during the first sensing period. In this case, all of the first switch SW1, the second switch SW2, and the third switch SW3 may be turned off during the first sensing period. That is, since all of the first to third switches SW1, SW2, and SW3 are in the open state during the first sensing period, no signal may be received from the global amplifier GA.

Next, during the second sensing period different from the first sensing period, the second sensing voltage V2 may be supplied from the global amplifier GA to the data lines DL (S30).

Referring to FIG. 3, during the second sensing period, the second sensing voltage V2 may be output from the global amplifier GA as the data voltage Vdata. In the second sensing period, the second transistor T2 may be turned on in response to the scan signal S[n], and the third transistor T3 may be turned on in response to the sensing control signal SEN[n]. At this time, the display device 10 may suppress the light emission of the pixel PXL by changing the second power source voltage VSS during the second sensing period, for example, increasing the voltage level of the second power source voltage VSS.

In the step (S30) of supplying the second sensing voltage V2, during the second sensing period, the first switch SW1 may be turned on, the second switch SW2 and the third switch SW3 may be turned off, a first buffer amplifier BF1 connected to the first data line DL1 may be in the high impedance (Hi-z) state, and the data voltage corresponding to the lowest grayscale may be output through a second buffer amplifier BF2 connected to the second data line DL2 and a third buffer amplifier BF3 connected to the third data line DL3. During the second sensing period, the second switch SW2 may be turned on, the first switch SW1 and the third switch SW3 may be turned off, the second buffer amplifier BF2 may be in the high impedance (Hi-z) state, and the data voltage corresponding to the lowest grayscale may be output through the first buffer amplifier BF1 and the third buffer amplifier BF3. In addition, during the second sensing period, the third switch SW3 may be turned on, the first switch SW1 and the second switch SW2 may be turned off, the third buffer amplifier BF3 may be in the high impedance (Hi-z) state, and the data voltage corresponding to the lowest grayscale may be output through the first buffer amplifier BF1 and the second buffer amplifier BF2.

Thereafter, during the second sensing period, the second sensing signal corresponding to the second sensing voltage V2 may be received from the pixels PXL through the sensing lines RL by the sensor SU in the data driver 300 (S40). The sensor SU may receive the second sensing signal from the pixel PXL1, PXL2 in response to the second sensing voltage V2 output from the global amplifier GA during the second sensing period.

In this case, the first sensing period and the second sensing period are only for differentiating sensing voltages input to the pixel PXL1, PXL2, and do not define a relationship between the preceding and following in time. That is, the second sensing period may precede the first sensing period.

Next, the compensation data may be generated based on the difference value between the first sensing signal and the second sensing signal by the sensor SU in the data driver 300 (S50).

The sensing capacitor CSEN of the sensor SU may store the voltage of the first sensing signal corresponding to the first sensing voltage V1 during the first sensing period, and store the voltage of the second sensing signal corresponding to the second sensing voltage V2 during the second sensing period.

In the first sensing period, the voltage Vsen1 (i.e., the voltage of the first sensing signal) stored at the sensing capacitor CSEN may be the value obtained by subtracting the sum of the threshold voltage ΔVth of the first transistor T1 (i.e., the driving transistor) and the voltage deviation ΔVdv of the buffer amplifier unit BF from the first sensing voltage V1. That is, Vsen1=V1−(ΔVth+ΔVdv).

In the second sensing period, the voltage Vsen2 (i.e., the voltage of the second sensing signal) stored at the sensing capacitor CSEN may be the value by subtracting the threshold voltage ΔVth of the first transistor T1 (i.e., the driving transistor) from the second sensing voltage V2. That is, Vsen2=V2−ΔVth.

In this case, the first sensing voltage V1 may have the same value as the second sensing voltage V2. For example, the buffer amplifier unit BF and the global amplifier GA may receive the same analog signal output from the same decoder 314 shown in FIG. 4.

When the first sensing voltage V1 and the second sensing voltage V2 have the same magnitude, the voltage stored at the sensing capacitor CSEN (i.e., the voltage of the second sensing signal) in the second sensing period may be greater than the voltage stored at the sensing capacitor CSEN (i.e., the voltage of the first sensing signal) in the first sensing period.

The compensation data calculation unit SDG may be connected between the fourth node N4 and the output switch SW_CH. The compensation data calculation unit SDG may receive the voltage (i.e., the voltage of the first sensing signal) stored at the sensing capacitor CSEN in the first sensing period, and may receive the voltage stored at the sensing capacitor CSEN (i.e., the voltage of the second sensing signal) in the second sensing period. The compensation data calculation unit SDG may calculate the difference value between the voltage of the received first sensing signal and the voltage of the received second sensing signal.

The analog-to-digital converter ADC may convert the difference value between the voltage of the first sensing signal and the voltage of the second sensing signal into the data value (for example, the digital code). That is, the data driver 300 may convert the sensing signal sampled through the analog-to-digital converter ADC from the analog form to the digital form. The sensing signal (i.e., the compensation data SD) in the digital form may be provided to the timing controller 400.

The timing controller 400 may receive the compensation data SD according to the external compensation operation from the data driver 300. The timing controller 400 may compensate for the deviation in deterioration of the driving transistor between the pixels PXL or the deviation in deterioration of the light emitting element between the pixels PXL by correcting the first data DATA1 based on the compensation data SD. The timing controller 400 may transmit the second data DATA2 which corresponds to the corrected first data DATA1 in the display period for displaying the image to the data driver 300.

According to the embodiments of the present invention, only the information on the threshold voltages ΔVth of the plurality of pixels PXL included in the display panel 100 may be calculated using one global amplifier GA. Therefore, the information on the threshold voltages ΔVth of the plurality of pixels PXL and the information on the voltage deviation ΔVdv of the buffer amplifiers BF of the data driver 300 may be independently managed. Accordingly, the compensation for the threshold voltages ΔVth of the plurality of pixels PXL and the compensation for the voltage deviation ΔVdv of the buffer amplifiers BF of the data driver 300 may be performed, respectively. As a result, since the deviation between sensing channels may be reduced, the compensation for the display device 10 may be more accurately performed.

In the display device according to the embodiments of the present invention, the deviation between channels of the external compensation circuit may be reduced by applying the same sensing voltage to the pixel through the global amplifier.

In the driving method of the display device according to the embodiments of the present invention, the deviation between channels of the external compensation circuit may be reduced by applying the same sensing voltage to the pixel through the global amplifier.

However, effects according to the present invention are not limited to the above-described effects, and may be variously extended without departing from the spirit and scope of the present invention.

The exemplary embodiments of the present invention have been described above with reference to the drawings. However, those skilled in the art to which the present invention pertains will appreciate that various modifications and changes can be made to the present invention without departing from the spirit and scope of the present invention described in the following claims.

What is claimed is:

1. A display device comprising:

a display panel including a plurality of pixels connected to data lines and sensing lines;

a data driver including a plurality of buffer amplifiers and a sensor, wherein the plurality of buffer amplifiers supplies a first sensing voltage to the data lines during a first sensing period, and the sensor receives a first sensing signal from the pixels through the sensing lines during the first sensing period; and a global amplifier which supplies a second sensing voltage to the data lines during a second sensing period different from the first sensing period, wherein the sensor receives a second sensing signal corresponding to the second sensing voltage from the pixels through the sensing lines during the second sensing period, and generates compensation data based on a difference value between the first sensing signal and the second sensing signal, wherein an output terminal of the global amplifier is connected to each of all data lines of the display panel through a first switch, a second switch, and a third switch, and wherein the first sensing signal is a value obtained by subtracting a sum of a threshold voltage of a driving transistor included in each of the pixels and a voltage deviation of the buffer amplifiers from the first sensing voltage, and the second sensing signal is a value obtained by subtracting the threshold voltage of the driving transistor in each of the pixels from the second sensing voltage.

2. The display device of claim 1, wherein the second sensing voltage has a same value as the first sensing voltage.

3. The display device of claim 2, wherein the second sensing signal has a greater value than the first sensing signal.

4. The display device of claim 1, wherein the each of the pixels includes a first sub-pixel connected to a first data line among the data lines, a second sub-pixel connected to a second data line among the data lines, and a third sub-pixel connected to a third data line among the data lines.

5. The display device of claim 4, wherein the first sub-pixel, the second sub-pixel, and the third sub-pixel of the each of the pixels are connected to one of the sensing lines.

6. The display device of claim 4, wherein the output terminal of the global amplifier is connected to the first data line through the first switch, connected to the second data line through the second switch, and connected to the third data line through the third switch.

7. The display device of claim 6, wherein each of the first switch, the second switch, and the third switch is in an open state during the first sensing period.

8. The display device of claim 1, further comprising:

a timing controller which receives first image data from outside, sums the first image data and the compensation data, and supplies second image data to the data driver.

9. The display device of claim 8, further comprising:

an analog-to-digital converter which is connected between an output terminal of the sensor and the timing controller and converts the difference value between the first sensing signal and the second sensing signal from an analog form to a digital form.

10. The display device of claim 1, wherein the display panel further includes scan lines, sensing control lines, a first power source line, and a second power source line, and wherein the each of the pixels includes:

a first transistor including a first electrode connected to the first power source line, a gate electrode connected to a first node, and a second electrode connected to a second node;

a second transistor including a first electrode connected to a data line of the data lines, a second electrode connected to the first node, and a gate electrode connected to a scan line of the scan lines;

a third transistor including a first electrode connected to the second node, a second electrode connected to a sensing line of the sensing lines, and a gate electrode connected to a sensing control line of the sensing control lines;

a storage capacitor connected between the first node and the second node; and a light emitting element connected between the second node and the second power source line.

11. The display device of claim 10, wherein the first transistor and the third transistor are turned on during at least some of the first sensing period and the second sensing period.

12. The display device of claim 10, wherein the sensor further includes:

an initialization switch connected between an initialization power source and the sensing line; and a sensing capacitor connected between the sensing line and a reference power source, and wherein the sensing capacitor is charged by a current provided through the second node when the initialization switch is in an open state and the third transistor is turned on.

13. The display device of claim 1, further comprising:

a power source stabilization capacitor connected between a reference power source and a first electrode connected to the output terminal of the global amplifier.

14. A driving method of a display device including a display panel including a plurality of pixels connected to data lines and sensing lines, comprising:

supplying a first sensing voltage to the data lines by a plurality of buffer amplifiers in a data driver during a first sensing period;

receiving a first sensing signal from the pixels through the sensing lines by a sensor in the data driver during the first sensing period;

supplying a second sensing voltage to the data lines from a global amplifier during a second sensing period different from the first sensing period;

receiving a second sensing signal corresponding to the second sensing voltage from the pixels through the sensing lines by the sensor in the data driver during the second sensing period; and generating compensation data based on a difference value between the first sensing signal and the second sensing signal by the sensor in the data driver, wherein an output terminal of the global amplifier is connected to each of all data lines of the display panel through a first switch, a second switch, and a third switch, and wherein the first sensing signal is a value obtained by subtracting a sum of a threshold voltage of a driving transistor included in each of the pixels and a voltage deviation of the buffer amplifiers from the first sensing voltage, and the second sensing signal is a value obtained by subtracting the threshold voltage of the driving transistor in each of the pixels from the second sensing voltage.

15. The driving method of claim 14, wherein the second sensing voltage has a same value as the first sensing voltage, and the second sensing signal has a greater value than the first sensing signal.

16. The driving method of claim 14, wherein each of the pixels includes a first sub-pixel, a second sub-pixel, and a third sub-pixel the driving method further comprising:

connecting the first sub-pixel to a first data line among the data lines;

connecting the second sub-pixel to a second data line among the data lines;

connecting the third sub-pixel to a third data line among the data lines, connecting an output terminal of the global amplifier to the first data line through a first switch connected to the second data line through a second switch, and connecting the third data line to the output terminal of the global amplifier through the third switch.

17. The driving method of claim 16, wherein each of the first switch, the second switch, and the third switch is in an open state during the first sensing period.

* * * * *